May 26, 1942.     H. A. PARKER     2,284,536
SHEET METAL CUTTING TOOL
Filed April 3, 1941
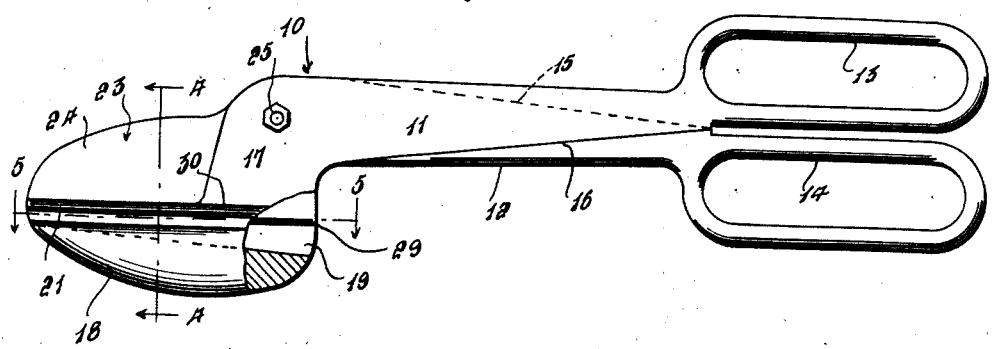
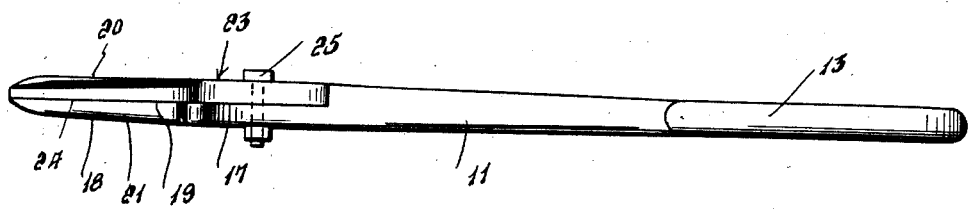
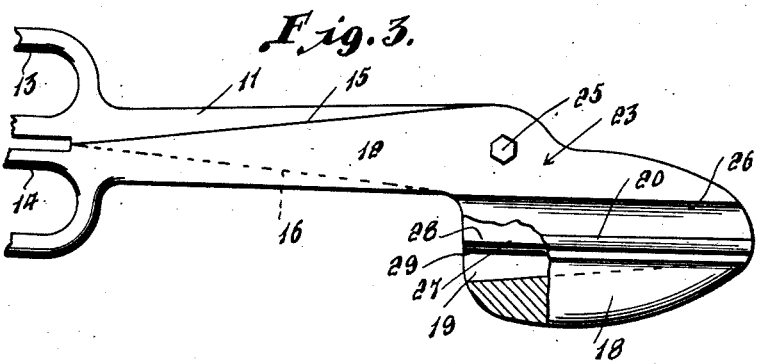
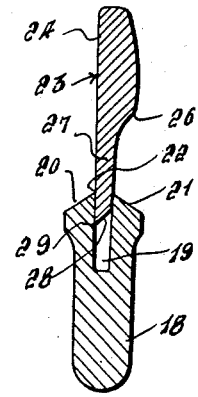
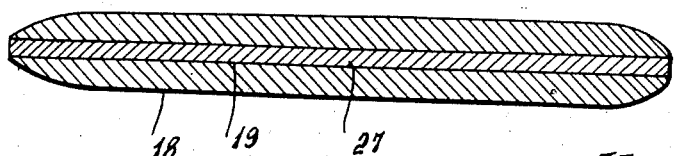
Inventor
Harry A. Parker
By
Attorney Patented May 26, 1942

2,284,536

UNITED STATES PATENT OFFICE 2,284,536

SHEET METAL CUTTING TOOL

Harry A. Parker, Langley, S. C., assignor of one-half to John S. Norris, Langley, S. C.

Application April 3, 1941, Serial No. 386,703

4 Claims. (Cl. 30—258)

This invention relates to an improved construction of sheet metal cutters or snips, and more particularly to a shear type cutter having means for supporting the sheet metal to be cut thereby, adjacent the cutting edges of the tool to prevent the metal from being bent by the cutting stroke of the tool.

It frequently occurs that in cutting sheet metal or similar material, especially adjacent the edge of the material, the material is bent down by one of the cutting edges and instead of being cut becomes wedged between the blades of the tool thereby spreading the blades and damaging the tool and reducing its efficiency as a shear type cutter.

It is therefore a particular aim of this invention to provide means for supporting the material to be cut on either side of and adjacent the cut being made to prevent the material from being bent down by the shear blades and to hold the material positioned so that it can be cut with the least possible effort and without damage to the cut edges.

Still another aim of the invention is to provide a sheet metal cutting tool having lever or handle portions for operating the shear blades or jaws and which are disposed substantially above the level of the jaws so that the handles or levers may pass over the material being cut.

Other objects and advantages of the invention will hereinafter become more fully apparent from the following description of the drawing, which illustrates a preferred embodiment thereof, and wherein:

Figure 1 is a side elevational view of a cutting tool constructed in accordance with the invention and shown in a closed position, Figure 2 is a top plan view of the same, Figure 3 is a fragmentary side elevational view, partly in section, looking toward the opposite side of the tool, and Figures 4 and 5 are enlarged sectional views taken substantially along the plane of the lines 4—4 and 5—5, respectively, of Figure 1.

Referring more particularly to the drawing, wherein like reference characters designate like or corresponding parts throughout the different views, 10 designates generally the sheet metal cutting tool in its entirety, and which comprises a pair of levers 11 and 12 having corresponding handles 13 and 14, respectively, at corresponding ends thereof. The lever 11 is recessed on its inner and underside, and the lever 12 is recessed on its inner and upper side, as seen at 15 and 16, respectively, so that the levers are disposed in substantially the same vertical plane, as best seen in Figure 2.

Lever 11 is provided at its opposite end with a down-turned portion 17 which is disposed substantially at a right angle to the lever 11 and which is formed integral with the lower jaw 18 at its extremity. The lower jaw 18 projects from the lower end of the portion 17 in a direction away from the lever 11 and is disposed substantially at a right angle to the portion 17 and substantially parallel to lever 11. The lower jaw 18 is relatively wide in cross section and is provided with a longitudinal slot 19 which opens outwardly of its upper surface and which extends substantially from end to end thereof and which forms the upper surfaces 20 and 21 of the lower jaw 18. As best seen in Figure 4, surfaces 20 and 21 are inclined downwardly and outwardly and the inner upper edge 22 of the surface 20, which is formed by surface 20 and one side wall of the slot 19, rises to a level slightly above that of the corresponding edge of the surface 21, for a purpose which will hereinafter be described. The shank portion 17 rises from the surface 20, adjacent the back end of the jaw 18.

The lever 12 at its end opposite to that provided with the handle 14 is provided with a downwardly offset jaw 23 having a flat side 24 a portion of which engages the inner side of the shank 17. A nut and bolt fastening 25 pivotally connects the levers 11 and 12. The nut and bolt fastening 25 engages the lever 11 substantially at the apex of said lever and its shank portion 17 and also engages the lever 12 substantially at the apex of said lever and its jaw 23. The opposite side 26 of the jaw 23 is curved inwardly, intermediate of its upper and lower edges so that its lower portion 27 is substantially narrower than its upper portion, as best seen in Figure 4, and is of a width to be received in the slot 19. The side 26 is beveled adjacent the lower edge of the jaw 23, as seen at 28 to form a cutting edge 29 which is arranged to co-act with the edge 22 to form a shear type cutter.

From the foregoing it will be apparent that a piece of sheet metal, not shown, can be placed between the jaws 18 and 23, when said jaws are open, so as to rest on the surfaces 20 and 21. When the handles 13 and 14 are moved toward one another the jaws 18 and 23 will be moved toward a closed position to execute a cutting stroke with the sheet metal being cut by the sharpened edges 22 and 29 and with the portions of the sheet metal, adjacent the cut, being supported by the surfaces 20 and 21 to prevent the sheet metal from bending down adjacent the point where it is being severed and to thereby avoid the danger of the jaws being spread. As the tool 10 is advanced after each cutting stroke, the cut edges of the sheet metal can pass rearwardly along the surfaces 20 and 21 and the outer side of the lower portion of the shank 17 is reduced, as seen at 30, to permit one cut edge of the sheet metal to pass therearound. Likewise, the levers 11 and 12 and the handles 13 and 14 are offset upwardly relatively to the cutting edges 22 and 29 so that said handles and levers can pass over the surface of the sheet metal as the tool 10 is advanced therethrough and need not move between the cut edges.

Various modifications and changes are contemplated and may obviously be resorted to as only a preferred embodiment of the invention has been disclosed.

I claim as my invention:

1. A metal cutting tool comprising a pair of pivotally connected jaws, one of said jaws being provided with a longitudinal slot opening outwardly of its upper surface, said other jaw having a cutting edge for engaging said slot, one side of said slot and a portion of the upper edge of said first mentioned jaw combining to form a cutting edge for cooperating with the cutting edge of said last mentioned jaw, and a pair of levers, said jaws being formed integral with complementary ends of said levers, and said levers being offset upwardly relatively to the jaws and being disposed above the level of the cutting edges.

2. A sheet metal cutting tool comprising upper and lower pivotally connected jaws, said upper jaw having a lower sharpened longitudinal edge forming a cutting edge, said lower jaw being provided with a longitudinal upwardly opening slot sized to snugly engage and receive the cutting edge of said upper jaw, when the jaws are closed, and said lower jaw being provided with outwardly and downwardly inclined upper surfaces on opposite sides of said slot and forming a support for material to be cut by the tool, one of said inclined surfaces of the lower jaw having its inner elevated edge disposed above corresponding edge of the other inclined surface, and said elevated edge forming the cutting edge of the lower jaw for cooperating with the sharpened, cutting edge of said upper jaw.

3. A tool as in claim 2, said upper jaw having a substantially flat side and an opposite, downwardly tapered side, a shank portion projecting upwardly from one side of the lower jaw and disposed on the flat side of said upper jaw, said shank portion being pivotally connected to said upper jaw for pivotally connecting the jaws.

4. A metal cutting tool comprising a pair of levers having handles at corresponding ends thereof, said levers being pivotally connected, adjacent their opposite ends, one of the levers, at its pivoted end being provided with a downwardly extending shank, a jaw projecting from the lower end of the shank in a direction away from said last mentioned lever, said jaw being disposed substantially parallel to its lever and being provided with an upwardly opening longitudinally extending channel, the other lever, at its pivoted end, having a downwardly offset downwardly tapered portion, said portion having a bevelled lower cutting edge, said cutting edge being movable into the channel, when the jaws are closed, the upper side portions of the first mentioned jaw, on both sides of the channel, being inclined outwardly and downwardly to provide a support for a piece of material to be cut, and the upper edge of one side of the channel forming a cutting edge to cooperate with the cutting edge of the last mentioned jaw.

HARRY A. PARKER.